US008361661B2

(12) United States Patent
Doe et al.

(10) Patent No.: US 8,361,661 B2
(45) Date of Patent: Jan. 29, 2013

(54) RECHARGEABLE MAGNESIUM ION CELL COMPONENTS AND ASSEMBLY

(75) Inventors: Robert Ellis Doe, Brighton, MA (US); George Earl Blomgren, Lakewood, OH (US); Kristin Aslaug Persson, Orinda, CA (US)

(73) Assignee: Pellion Technologies Inc., Cambridge, MA (US)

( * ) Notice: Subject to any disclaimer, the term of this patent is extended or adjusted under 35 U.S.C. 154(b) by 39 days.

(21) Appl. No.: 13/043,296

(22) Filed: Mar. 8, 2011

(65) Prior Publication Data

US 2011/0159381 A1    Jun. 30, 2011

(51) Int. Cl.
*H01M 10/56* (2006.01)

(52) U.S. Cl. ...................................... 429/337; 429/218.1

(58) Field of Classification Search .................. 429/337, 429/199, 218.1, 219, 220, 221, 224, 231.1, 429/231.2, 231.5, 231.6, 245, 341
See application file for complete search history.

(56) References Cited

U.S. PATENT DOCUMENTS

| | | | | |
|---|---|---|---|---|
| 3,849,868 A | * | 11/1974 | Jost | 228/155 |
| 3,945,847 A | * | 3/1976 | Kordesch et al. | 429/206 |
| 4,104,451 A | | 8/1978 | Klemann et al. | |
| 4,894,302 A | | 1/1990 | Hoffman et al. | |
| 5,491,039 A | | 2/1996 | Shackle | |
| 5,747,195 A | * | 5/1998 | Alamgir et al. | 429/235 |
| 5,849,432 A | | 12/1998 | Angell et al. | |
| 6,030,720 A | | 2/2000 | Chu et al. | |
| 6,316,141 B1 | | 11/2001 | Aurbach et al. | |
| 6,713,212 B2 | | 3/2004 | Aurbach et al. | |
| 2008/0182176 A1 | * | 7/2008 | Aurbach et al. | 429/337 |
| 2009/0068568 A1 | | 3/2009 | Yamamoto et al. | |
| 2010/0136438 A1 | | 6/2010 | Nakayama et al. | |
| 2010/0273062 A1 | * | 10/2010 | Tsuchida et al. | 429/304 |
| 2010/0285352 A1 | | 11/2010 | Juzkow et al. | |

FOREIGN PATENT DOCUMENTS

| | | |
|---|---|---|
| WO | WO-2009/111744 A2 | 9/2009 |
| WO | WO-2009/148971 A2 | 12/2009 |

OTHER PUBLICATIONS

Aurbach, D. et al., "Prototype systems for rechargeable magnesium batteries," Nature, vol. 407, Oct. 12, 2000, pp. 724-727.
Kanamura, K. et al., "Anodic oxidation of nonaqueous electrolytes on cathode materials and current collectors for rechargeable lithium batteries," Journal of Power Sources 81-82 (1999) 123-129.
Mizrahi, O. et al., "Electrolyte Solutions with a Wide Electrochemical Window for Rechargeable Magnesium Batteries," Journal of the Electrochemical Society, 155 (2) A103-A109 (2008).
Morita, M. et al., "Anodic behavior of aluminum in organic solutions with different electrolytic salts for lithium ion batteries," Electrochimica Acta 47 (2002) 2787-2793.

(Continued)

*Primary Examiner* — Jennifer K Michener
*Assistant Examiner* — Monique Wills
(74) *Attorney, Agent, or Firm* — Wilmer Cutler Pickering Hale and Dorr LLP (57) ABSTRACT

A magnesium battery electrode assembly is described, including a current collector comprising a carbonaceous material and an electrode layer comprising an electrode active material disposed on the current collector.

14 Claims, 7 Drawing Sheets

OTHER PUBLICATIONS

Wu, H.C. et al., "High-temperature carbon-coated aluminum current collector for enhanced power performance of LiFePO$_4$ electrode of Li-ion batteries," Electrochemistry Communications 12 (2010) 488-491.

Gregory et al., "Nonaqueous Electrochemistry of Magnesium: Applications to Energy Storage," J. Electrochem. Soc., vol. 137, No. 3, Mar. 1990, pp. 775-780.

Imamura et al., "Characterization of Magnesium-Intercalated V$_2$O$_5$/Carbon Composites," Science Direct, Solid State Ionics, 161, 2003, pp. 173-180.

Kurihara et al., "Preparation of Cathode Active Material for Rechargeable Magnesium Battery by Atmospheric Pressure Microwave Discharge Using Carbon Felt Pieces," Chemistry Letters, vol. 37, No. 3, 2008, pp. 376-377.

Narayanan et al., "Magnesium Ion Conducting, Room Temperature Molten Electrolytes," Electrochemistry Communications, 11, 2009, pp. 2027-2031.

Novak et al. "Electrochemical Insertion oof Magnesium into Hydrated Vanadium Bronzes," J. Electrochem. Soc., vol. 142, No. 8, Aug. 1995, pp. 2544-2550.

Novak et al., "Technical Papers Solid-State Science and Technology: Electrochemical Insertion of Magnesium in Metal Oxides and Sulfides from Aprotic Electrolytes," J. Electrochem. Soc., vol. 140, No. 1, Jan. 1993, pp. 140-144.

NuLi et al., Electrochemical Intercalculation of Mg$^{2+}$ iin Magnesium Manganese Silicate and Its Application as High-Energy Rechargeable Magnesium Battery Cathode, J. Phys. Chem. C, 2009, vol. 113, No. 28, pp. 12594-12597.

Spahr et al., "Electrochemical Insertion of Lithium, Sodium, and Magnesium in Molybdenum(VI) Oxide," Journal of Power Sources 54, 1995, pp. 346-351.

* cited by examiner

| Current Collector Candidate | Anodic Stability Limit ($I > 100 uA/cm^2$) |
|---|---|
| Pt | 2.90 |
| Au | 2.61 |
| Ni | 2.01 |
| Ti | 2.58 |
| Glassy Carbon | 2.85 |
| Carbon Sheet (Graphfoil and Fiber) | 2.99 |

RECHARGEABLE MAGNESIUM ION CELL COMPONENTS AND ASSEMBLY

INCORPORATION BY REFERENCE

All patents, patent applications and publications cited herein are hereby incorporated by reference in their entirety in order to more fully describe the state of the art as known to those skilled therein as of the date of the invention described herein.

FIELD OF INVENTION

The subject matter generally relates to current collectors for use in Magnesium batteries.

BACKGROUND

There is a persistent demand for devices capable of storing more energy (Wh/l or Wh/kg) than today's premier rechargeable Li-ion batteries. One increasingly sought after route to meeting this demand is to utilize divalent magnesium ion ($Mg^{2+}$), rather than the monovalent cation lithium ($Li^+$) because magnesium enables nearly twice as much charge to be transferred, per weight or volume, as $Li^+$ thus enabling high energy density. Furthermore the abundance of Mg metal and readily available compounds containing Mg will enable significant cost reduction relative to Li-ion batteries. Enabling a practical rechargeable Mg battery with an Mg metal anode requires electrolytes composed of strong Lewis basic organo-Mg compounds (i.e., Grignards), often complexed with a strong Lewis acid (e.g., $AlCl_3$), however the use of such electrolytes requires components of the battery to be composed of materials which can withstand corrosive reactions. One key battery component is the electrode current collector, which offers structural support to the electrode active material, and electrically conducts to complete the circuit which stores and delivers power to a device. To date, inert noble metals such as Platinum (Pt) have been used to demonstrate electrochemical reactions between Mg electrolytes and active materials such as $Mo_6S_8$. However commercial realization of rechargeable Mg battery cells requires readily available, cost effective current collectors.

SUMMARY OF THE INVENTION

Current collectors for magnesium batteries comprised of carbonaceous material are disclosed herein. As used herein, carbonaceous material refers to materials containing carbon in whole and in part, which provide an electronically conducting support that is chemically and electrochemically inert from reaction with other cell components, for a Magnesium battery active materials. Non-limiting examples of carbonaceous materials include graphite, carbon fiber, glassy carbon, amorphous carbon, and pyrolitic carbon. In some embodiments, the current collector in whole comprises carbon. In other embodiments, the current collector in part comprises carbon. Non-limiting examples of current collector comprising carbon in part includes metal coated with carbon such as GrafTech Grafoil Metal Reinforced Laminate Grades TG-251, GHJ, GHE, GHR, GHH, and Showa Denko SDX. In some embodiments, the carbon-comprising current collector includes form factors, including but not limited to sheet, film, foil, tubes, microfoil, coating or laminate upon metal foil, plate, and rod. The carbon-containing current collector is inert towards Mg electrolytes and results in anodic stability comparable to magnesium battery using noble metals such as Pt as the current collector. The carbon-containing current collector disclosed herein enables cost-effective fabrication of magnesium batteries.

This invention enables significant increases in the useful voltage of a Magnesium (Mg) ion cell by employing carbonaceous current collectors to support the electrode material thus inhibiting corrosion reactions common to many metals and alloys immersed in Mg ion electrolyte solutions, that limit the voltage and capacity of the cell.

In some specific embodiments, a practical Mg ion cell with a voltage of more than 1-1.25 V is achieved, in which the electrolyte comprises organo-Mg compounds, Grignard reagents like phenyl magnesium chloride, or complex solutions prepared by addition of a Lewis acid such as $AlCl_3$. Non-limiting examples of such electrolyte include phenyl magnesium chloride: aluminum chloride solutions in tetrahydrofuran (APC). A formula that generalizes the mixture of species that result from transmetallation in ethereal solutions between Grignards and $AlCl_3$ can be represented as $(MgX)^+$-$(R_y AlX_{4-y})^-$ in which R is selected from a group comprising akyl ligands such as methyl, ethyl, butyl, or aryl ligands such as phenyl, or derivatives thereof; X is a halide F, Cl, Br, I; y is greater than 0 and less than 3. These solutions have been shown to display electrochemical stability window of up to about 3 V vs. Mg on noble platinum (Pt) electrodes, however, the stability window is considerably less depending upon the current collector material. For example, aluminum (Al) and stainless steel (SS) display stability windows of only between 1 to 2 V vs. Mg because these materials undergo a corrosion reaction above that potential. Hence common, inexpensive materials such as Al and SS cannot serve as current collector that enable 3 V rechargeable Mg ion cells while Pt current collectors are too expensive to use in commercially viable Mg ion cells. In some embodiments, carbonaceous current collectors, e.g., carbon fiber composites, are used to circumvent this problem and result in stability of the current collector against oxidative corrosion reactions equal to noble metals such as Pt. Carbonaceous materials can act as inert current collectors for either or both the positive and negative electrode enabling a practical Mg ion cell. As disclosed herein, carbonaceous materials are used as positive and/or negative electrode current collectors, including carbon fiber films, rods, and tubes that are prepared by pulling or wrapping continuous carbon fibers and epoxy resin (e.g., vinylester base) to form the desired diameter/cross section and form a densely reinforced carbon composite. Similar, useful current collectors can also include graphitic, glassy, pyrolitic carbons materials, or metal foils coated with such carbons.

As used herein, positive electrode and cathode are used interchangeably. As used herein, negative electrode and anode are used interchangeably.

As used herein, anodic stability refers to the voltage of the cell vs. $Mg/Mg^{2+}$ when the oxidative current response exceeds $100\,\mu A/cm^2$ which shows that Mg-ions are no longer present on the surface of the working electrode thus indicating the corrosion of the working electrode by the electrolyte and/or decomposition of the electrolyte.

In one aspect, A magnesium battery electrode assembly is described, including a current collector comprising a carbonaceous material and an electrode layer including an electrode active material disposed on the current collector.

In any of the preceding embodiments, the carbonaceous material is selected for the group consisting of graphitic carbon, carbon fiber, glassy carbon, pyrolitic carbon, amorphous carbon, or a combination thereof.

In any of the preceding embodiments, the magnesium battery electrode assembly further includes a form factor, where the form factor is one or more form factors selected from the group consisting of sheet, film, foil, rod, tube, plate, woven and non-woven fabric, textile, tape, microfoil, coating, laminate, and combinations thereof.

In any of the preceding embodiments, the electrode is a positive electrode.

In any of the preceding embodiments, the electrode is a negative electrode.

In any of the preceding embodiments, where the current collector is made of the carbonaceous material.

In any of the preceding embodiments, the current collector is a composite current collector including the carbonaceous material and a second material.

In any of the preceding embodiments, the second material is a metal and the current collector includes the metal coated with the carbonaceous material.

In any of the preceding embodiments, the electrode is a positive electrode.

In any of the preceding embodiments, the electrode is a negative electrode.

In any of the preceding embodiments, the metal is one or more metals selected from the group consisting of Al, Cu, Ti, Ni, stainless steel, and alloys thereof.

In any of the preceding embodiments, the positive electrode active material is one or more materials selected from the group consisting of Chevrel phase $Mo_6S_8$, $MnO_2$, CuS, $Cu_2S$, $Ag_2S$, $CrS_2$, and $VOPO_4$; layered compounds $TiS_2$, $V_2O_5$, $MgVO_3$, $MoS_2$, $MgV_2O_5$, and $MoO_3$; Spinel structured compounds $CuCr_2S_4$, $MgCr_2S_4$, $MgMn_2O_4$, and $Mg_2MnO_4$; NASICON structured compounds $MgFe_2(PO_4)_3$ and $MgV_2(PO_4)_3$; Olivine structured compounds $MgMnSiO_4$ and $MgFe_2(PO_4)_2$; Tavorite structured compound $Mg_{0.5}VPO_4F$; pyrophosphates $TiP_2O_7$ and $VP_2O_7$; $FeF_3$, and combinations thereof.

In any of the preceding embodiments, the positive electrode layer further includes an electronically conductive additive.

In any of the preceding embodiments, the positive electrode layer further includes a polymeric binder.

A magnesium battery including the magnesium battery electrode assembly of any of the preceding embodiments, a negative electrode, and an electrolyte.

In any of the preceding embodiments, the electrolyte includes: a Lewis-base organo-magnesium compounds RMgX, wherein R is selected from a group consisting of akyl ligands such as methyl, ethyl, butyl, or aryl, benzyl, amido, napthal, phenyl, alkenyl, alkynyl, or derivatives thereof and X is a halide F, Cl, Br, I; a Lewis-acid compound such as $AlCl_3$, $BCl_3$, $AlCl_2Et$, $FeCl_2$, $FeCl_3$, $TiCl_4$; and a solvent.

In any of the preceding embodiments, the solvent is one or more solvents selected from the group consisting of ether, polyethers, tetrahydrofuran, 2-methyl tetrahydrofuran, dimethoxyethane, glyme, monoglyme, dimethyl glycol, ethylene glycol, dimethyl ether, diethyl ether, ethyl glyme, diglyme, proglyme, ethyl diglyme, triglyme, butyl diglyme, tetraglyme, polyglyme, higlyme, and combinations thereof.

In any of the preceding embodiments, the electrolyte further includes an additional salt.

In any of the preceding embodiments, the additional salt is one or more salts selected from the group consisting of $MgCl_2$, $Mg(ClO_4)_2$, $Mg(BF_4)_2$, $Mg(AsF_6)_2$, $Mg(PF_6)_2$, $Mg(CF_3SO_3)_2$, $Mg[N(CF_3SO_2)_2]_2$, $Mg[C(SO_2CF_3)_3]_2$, LiCl, $LiClO_4$, $LiBF_4$, $LiAsF_6$, $LiPF_6$, $Li(CF_3SO_3)$, $LiN(CF_3SO_2)_2$, $LiC(SO_2CF_3)_3$, NaCl, $NaClO_4$, $NaBF_4$, $NaAsF_6$, $NaPF_6$, $Na(CF_3SO_3)$, $NaN(CF_3SO_2)_2$, $NaC(SO_2CF_3)_3$, and combinations thereof.

A magnesium battery comprising the magnesium battery electrode assembly of any of the preceding embodiments, a negative electrode, and an electrolyte.

DETAILED DESCRIPTION

Current collectors including carbonaceous material for magnesium batteries are disclosed herein.

Aluminum (Al) is a commonly used material for the cathode current collector in today's Li-ion batteries, while Copper (Cu) is a commonly used anode current collector. It is well established by the work of K. Kanamura [*J. Power Sources*, Vol. 81-82, pp. 123-129, 1999] and Morita et al. [*Electrochimica Acta*, Vol. 47, pp. 2787-2793, 2002] that during the first several charge and discharge cycles of a Li-ion battery there is a significant amount electrolyte decomposition that occurs due to so-called "parasitic" reactions, that stabilize the current collector surfaces for long-term cycling. The decomposition products passivate the current collectors and electrode materials with protective films composed of inert species to prevent electron tunneling (e.g., further reaction) while enabling Li-ion migration (e.g., insertion/removal of Li from $LiCoO_2$). For example parasitic reactions resulting in decomposition of electrolyte components (e.g., the common salt $LiPF_6$) on the Al current collector produce species such as $AlF_3$ during the breakdown of fluorinated anions like $PF_6^-$. This film formation is critical because it inhibits further electrolyte decomposition, and corrosion of the Al current collector when charging the cell above the dissolution potential of Al.

In contrast to Li-ion, rechargeable Mg batteries utilizing traditional aprotic salts in carbonate solvents akin to those in Li-ion batteries (e.g. $Mg(PF_6)_2$ or $Mg(ClO_4)_2$ in propylene carbonate) do not show reversible electrochemical reactions because the protective films overwhelmingly inhibit Mg migration into the active material such as an Mg metal anode. Instead the development of rechargeable Mg batteries has required the development of electrolytes that inhibit the formation of any stable films. As a result, prototype magnesium batteries using a Mg-metal anode, an electrolyte composed of an organo-magnesium (organo-Mg or Grignard) complex in organic solvent, and the $Mg_xMg_6T_8$ (where $0<x<1$ and $T=S$ or Se), e.g., "Chevrel" phase cathode have proved capable of delivering nearly theoretical cathode capacity at a rate of C/8 with less than 15% capacity fade at 100% depth of discharge for greater than 2,000 cycles (Aurbach et al., Nature, Vol. 407, pp 724-727, 2000; Mizrahi et al., J. Electrochem. Soc. Vol. 155, pp A103-A109, 2008). These prior results clearly show that there is no intrinsic limitation keeping Mg-metal batteries from surpassing the energy density of contemporary battery chemistries such as Li-ion as long as the presence of stable passivating films are avoided.

Grignard reagents electrochemically deposit magnesium in a reversible fashion, which enables magnesium metal to be used as an anodic, or negative electrode, material. These compounds inhibit formation of the stable passivating film on the surface that impedes migration of all polyvalent ions including $Mg^{2+}$. Furthermore, the lack of stable passivating film allows magnesium to deposit on the anode in a reversible manner that does not readily accommodate the formation of dendrites. In addition, magnesium deposits with a high Coulombic efficiency since no parasitic reactions transpire to consume the electrolyte solution. Such behavior is quite the contrast to that long-observed when depositing $Li^+$ from polar aprotic solutions onto Li-metal anodes. However limited anodic stability of Grignard reagents alone (only ~1 V) prevents the pairing of magnesium anodes with a cathode that allows for reasonable cell voltage.

The first generation of magnesium batteries utilizes electrolytes mixtures of a Lewis-basic organo-magnesium compound (i.e., Grignard) with a strong Lewis acid such as $AlCl_3$, which results in a useful electrolyte stability window with about 100% reversibility of magnesium deposition. Through the utilization of transmetalation between the Lewis Base and Lewis Acid, and proper control of the Lewis acid/base ratio and final molarity of this complex in solution, the first generation magnesium battery electrolytes were stable to ~2-2.2 V vs. $Mg/Mg^{2+}$ as demonstrated in U.S. Pat. No. 6,316,141 and U.S. Pat. No. 6,713,212. Recent gains in anodic stability to ~3 V vs. $Mg/Mg^{2+}$ (close to that of the ethereal solvents) have been achieved by Mizrahi et al. (J. Electrochem. Soc., Vol. 155, pp A103-A109, 2008). Hence, with the development of magnesium electrolytes with anodic stability up to about 3 V vs. Mg, and the proven cyclability of Mg-metal anodes, high-energy-density cathode electroactive materials, similar to Chevrel phase $Mo_6S_8$, can be used to create rechargeable Mg batteries with very high energy density and specific energy.

Reversible electrochemical insertion of Mg into active materials such as Chevrel phase has primarily been accomplished in cells using a current collector consisting of an inert noble metal such as Pt. Such necessity makes production of commercially practical Mg batteries cost prohibitive due to the high cost of Pt and other noble metals.

Figure 1:
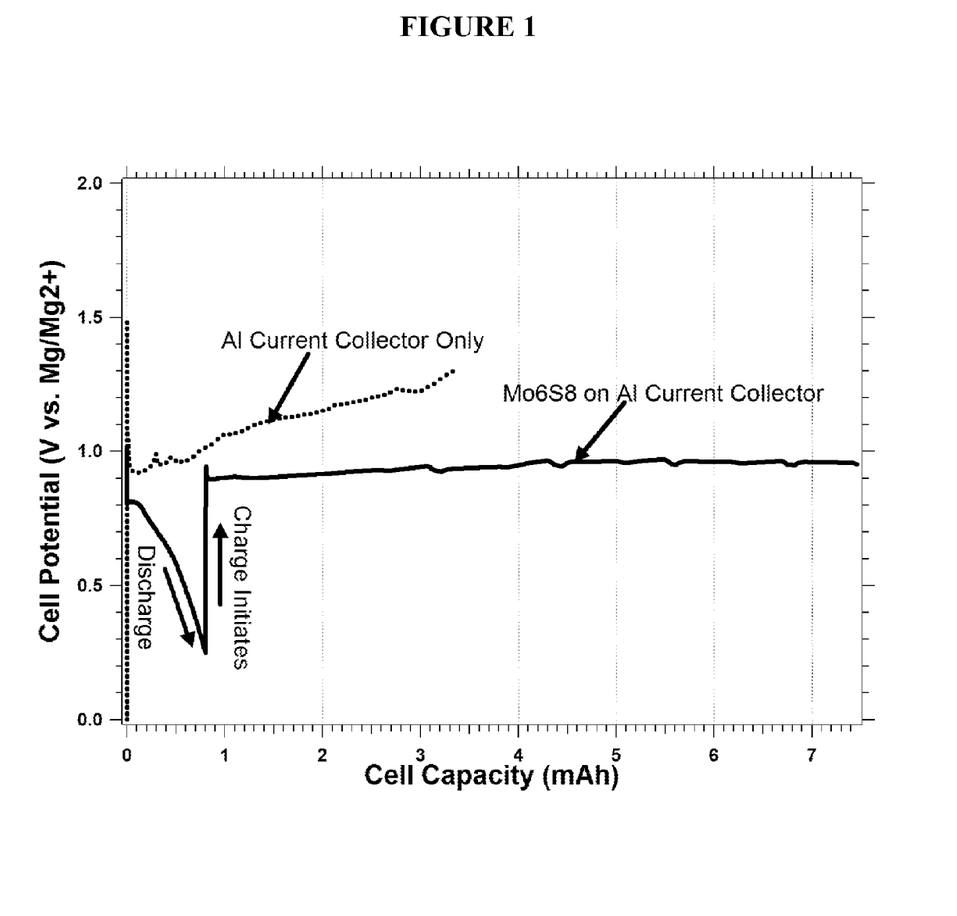
FIG. 1 demonstrates the constant current discharging and charging of two cells: one cell containing a Chevrel phase, $Mo_6S_8$, cathode coated on Al current collector (solid, black line), and the second cell containing only the Al current collector (dashed, black line).

FIG. 1 illustrates the constant current discharging and charging behavior of two cells: one cell containing a Chevrel phase, Mo6S8, cathode coated on Al current collector (solid, black line), and the second cell containing only the Al current collector (dashed, black line). Both cells shown here utilize an Mg metal anode, and 0.25 M (2 $PhMgCl$:1 $AlCl_3$) "APC" electrolyte. Initially, Mg insertion into $Mo_6S_8$ takes place from the initial open-circuit voltage (OCV) of the cell, ~0.8 V, until completing at 0.25 V vs. Mg. This process corresponds to about 0.8 mAh capacity being passed through the cell. The subsequent charging of the cell occurs with an increase of the voltage to ~0.9 V vs. Mg, at which point the cell voltage remains constant well past the expected maximum reversible capacity (0.8 mAh), and does not proceed to the charge cutoff of 2 V vs. Mg. Here, the Al current collector dominates the current response of the cell delivering capacity that will continue indefinitely (~6.5 times that of the discharge capacity in this figure). Such behavior is indicative of a corrosion process, rather than electrochemical de-insertion of Mg from the $Mo_6S_8$ cathode; specifically this corrosion event is related to an interaction between an organo-Mg electrolyte "APC" and the Al current collector. This interaction is highlighted in the second cell (dashed, black line) whereby the constant current discharging and charging of a cell containing only the Al current only. In this example the cell quickly polarizes to the end of discharge step because there is no electroactive specie such as $Mo_6S_8$ into which Mg can insert. Thereafter the cell attempts to charge, producing capacity indefinitely at ~0.9 V vs. Mg because of the parasitic corrosion of the Al current collector and or the consumption of electrolyte.

Figure 2:
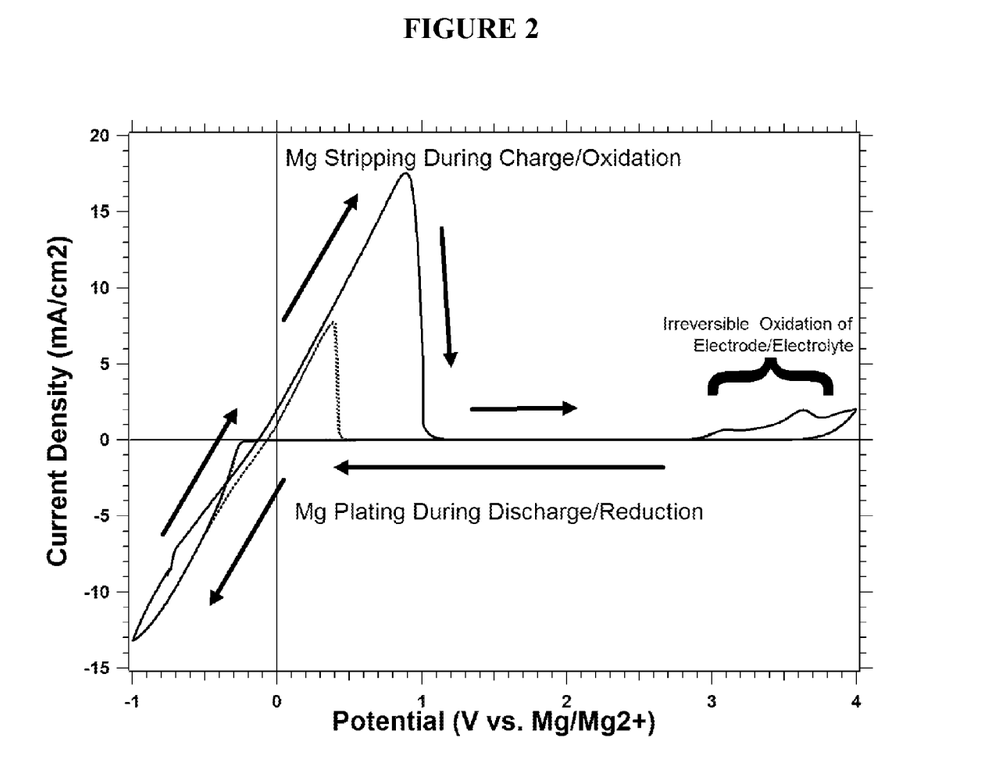
FIG. 2 shows cyclic voltammogram of a cell employing a platinum working electrode, magnesium metal as the counter and reference electrodes immersed in 0.25 M APC (2 $PhMgCl:1\ AlCl_3$) electrolyte.

It is clear from the above examples that Al cannot be employed as a practical current collector for rechargeable Mg batteries making use of Mg metal anodes, organo-Mg electrolytes based upon Grignard reagents, or complexes thereof with Lewis acids, and exhibiting greater than ~1 V. Thus the interactions of these electrolytes with Pt and a variety of materials are studied by employing electroanalytical techniques such as cyclic voltammetry. FIG. 2 demonstrates a typical voltammogram for a cell employing a platinum working electrode, magnesium metal as the counter and reference electrodes, all immersed in 0.25 M APC (2 $PhMgCl$:1 $AlCl_3$) electrolyte. The voltage scan (solid line), taken at 25 mV/s, sweeps from the OCV to the negative direction until –1 V vs. $Mg/Mg^{2+}$. This demonstrates Mg deposition from solution as current response forming a reductive peak, and is observed below about –0.3 V vs. $Mg/Mg^{2+}$. Subsequently the scan moves in the positive direction, first demonstrating Mg stripping (of that Mg just electrodeposited) from the surface of the Pt electrode. This event is characterized by the oxidative peak with maximum current at +1 V vs. $Mg/Mg^{2+}$ in FIG. 2. Thereafter the scan continues in the positive direction to +4 V vs. $Mg/Mg^{2+}$. During this segment of the reaction, the current response initially returns to background levels (i.e., <100 $\mu A/cm^2$) until significant current increase occurs when the voltage becomes greater than 2.90 V vs. $Mg/Mg^{2+}$. Such a feature is indicative of the corrosion of the working electrode by the electrolyte and/or decomposition of the electrolyte. FIG. 2 contains an additional voltammogram (dashed line) obtained within smaller voltage limits, from OCV to –0.5 V to +3 V vs. $Mg/Mg^{2+}$. This experiment represents limits within which only Mg plating and stripping occurs (i.e., no oxidative corrosion and/or decomposition is observed to 3 V vs. $Mg/Mg^{2+}$). This figure shows that applying a voltage greater than 2.90 V vs. $Mg/Mg^{2+}$ will result in current associated with the corrosion of Pt and/or the breakdown of APC solution at the Pt surface. An analogous response would be observed when charging an Mg battery containing a Pt current collector to voltages greater than 2.90 V vs. $Mg/Mg^{2+}$. The anodic stability, defined here as a current response of >100 $\mu A/cm^2$, of several materials including Titanium (Ti) and Nickel (Ni) is included with Pt and Gold (Au) in the table of FIG. 3. These experiments demonstrate that non-noble metals generally exhibit significantly lower anodic stability than noble metals in organo-Mg electrolytes. Specifically, Ni corrodes above 2.01 V vs. Mg/Mg$^{2+}$ while Ti corrodes above 2.58 V vs. Mg/Mg$^{2+}$, both being lower voltage than the anodic stability of Au (2.61 V vs. Mg/Mg$^{2+}$) and Pt at 2.90 V vs. Mg/Mg$^{2+}$. The anodic stability of Ti and Ni is considerably higher than that of Al and stainless steel, thus indicating that it may be possible to use these materials as current collectors for a low voltage cathode such as $Mo_6S_8$ (as was shown for Ni in U.S. patent application Ser. No. 11/899,319), but likely making it difficult to utilize the electrochemical reactions of insertion materials in the 2-3 V vs. Mg range of APC and other high voltage organo-Mg electrolytes.

Carbon-based current collectors as described herein are used as a low cost alternative with anodic stability equivalent to noble metal current collectors such as Pt. Disclosed herein are a variety of carbon-based and carbon coated materials for use as current collector material for Mg batteries.

Figures 4, 4A:
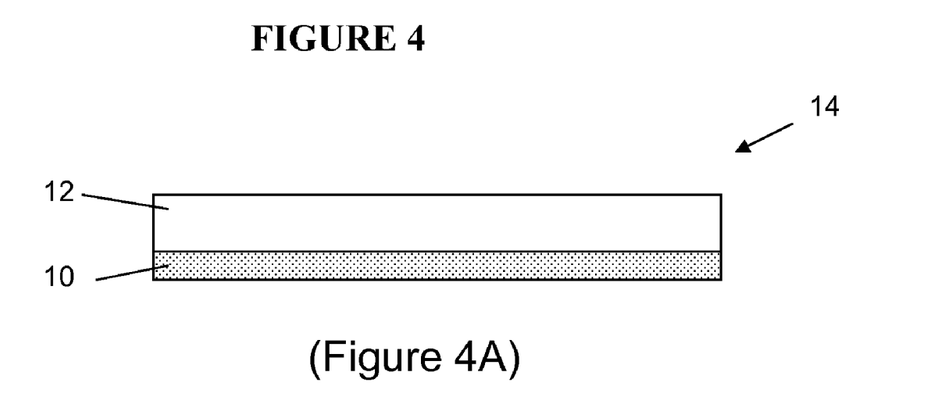
FIG. 4A illustrates a positive electrode assembly of a magnesium battery including a carbon-containing current collector.

A Mg battery positive electrode—current collector assembly 14 is shown in FIG. 4A. Positive current collector 10 includes, in whole or in part, a carbonaceous material and a positive electrode layer 12 is in electrical communication with the current collector.

Figure 4B:
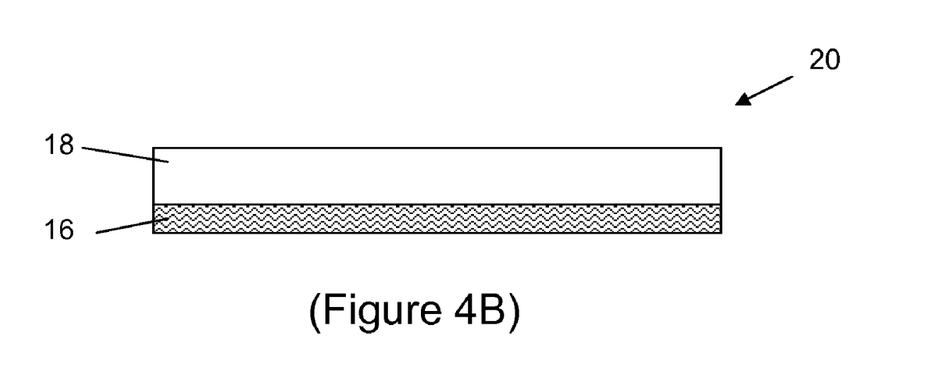
FIG. 4B illustrates a negative electrode assembly of a magnesium battery including a carbon-containing current collector.

A Mg battery negative electrode-current collector assembly 20 is shown in FIG. 4B. Negative current collector 16 includes, in whole or in part, a carbonaceous material and a positive electrode layer 18 is in electrical communication with the current collector.

By "carbonaceous" or "carbon-containing", it is meant a material that is rich in carbon. Non-limiting examples of carbonaceous materials for the negative or positive electrode current collector include graphite, carbon fiber, glassy carbon, carbon black, acetylene black, and pyrolitic carbon. Non-limiting examples of such carbonaceous materials include carbon fiber laminate from Graphtek, Unizero carbon fiber paper from Graphtek, graphite and carbon fabrics from McMaster Can, Kynol fabric 507-10, and 507-15, and 507-20, Kynol felt 211-10, Kynol fiber ACF-1603-10, and ACF-1603-15, and ACF-1603-20, and ACF-1603-25, graphite foil from Alfa Aesar, Carbon fiber laminate and rod from Graphitestore.com, single and double sided conductive graphite tapes from Electron Microscopy Sciences, and CS Hyde Co., and Ted Pella Inc., cohesive carbon sheets from Electron Microscopy Sciences, Glassy Carbon from Alfa Aesar, GraphTech Grafcell Grade GDB, GraphTech Grafoil Single Layer Grades, CTC, Super GTO, GTA, GTB, GTJ, GTX, TG-411, GraphTech Grafoil Non-Metal Reinforced Grades GHC, GHP, GHW, Grafkote, GHN, and other GraphTek Grafoil Grades GHH, TG-251, GHE, GHR, GHL, GTH, TG-679. In some embodiments, the current collector in whole contains the carbonaceous material, i.e., the current collector is made of the carbonaceous material. Suitable methods of preparing current collectors from carbonaceous materials include compressing particles of chemically or mechanically exfoliated or expanded synthetic and natural graphite and mixtures thereof such as carbon black, Super P, Super C65, Ensaco black, Ketjen black, acetylene black, synthetic graphite such as Timrex SFG-6, Timrex SFG-15, Timrex SFG-44, Timrex KS-6, Timrex KS-15, Timrex KS-44, natural flake graphite, carbon nanotubes, fullerenes, hard carbon, and mesocarbon microbeads into a sheet. In some embodiments, it is preferable to thermally anneal the carbonaceous material before and after compression of the carbonaceous material(s). In some embodiments it is preferable to compress the carbonaceous materials with polymer binders include polypropylene, poly-ester, poly-vinylidene fluoride (PVdF), poly(vinylidene fluoride-co-hexafluoropropene) (PVdF-HFP), Polytetrafluoroethylene (PTFE), Kynar Flex 2801, Kynar Powerflex LBG, and Kynar HSV 900, Teflon. In some embodiments, it is preferable to cast a small micron thin phenolic-based adhesive layer onto the carbonaceous material, and in other embodiments thermally bonding the carbonaceous layer with a polymer insert of the aforementioned binders, or a glass fiber insert, is preferred. In other embodiments, the current collector in part contains the carbonaceous material. In some embodiments, the current collector is a composite current collector containing a carbonaceous material and a second material. In some embodiments, the second material is a metal. Non-limiting examples of current collector comprising carbon in part includes a metal coated with carbon, GrafTech Grafoil Metal Reinforced Laminate Grades TG-251, GHJ, GHE, GHR, GHH, and Showa Denko SDX. Suitable metal includes, but are not limited to, Al, Cu, Ti, Ni, stainless steel, in the form of a sheet or foil. Suitable carbonaceous materials to coat upon the metal include chemically or mechanically exfoliated or expanded synthetic and natural graphite and mixtures thereof such as carbon black, Super P, Super C65, Ensaco black, Ketjen black, acetylene black, synthetic graphite such as Timrex SFG-6, Timrex SFG-15, Timrex SFG-44, Timrex KS-6, Timrex KS-15, Timrex KS-44, natural flake graphite, carbon nanotubes, fullerenes, hard carbon, and mesocarbon microbeads into a sheet. The carbonaceous material can be deposited onto the metal using any method known in the art, including, but not limited to, spraying from aerosol, coating a suspension from organic or aqueous media, coating a hydrocarbon precursor that is subsequently decomposed, application with an adhesive, cold or hot pressing, cold or hot rolling, cold or hot extrusion with metal, and cold or hot calendaring onto metal. Each of these methods may be performed in ambient, inert, or vacuum atmosphere. These methods may make use of repeated coating followed by thermal annealing in order to bring about decomposition to carbon, removal of moisture and oxygen, and/or create an intimate joining of the carbon to the metal with or without an intermediate layer of metal carbide forming. In some embodiments, a pretreatment of the metal surface by chemical or mechanical roughening may be necessary or desirable in order to bring about full adhesion of the carbonaceous material. In some embodiments, the carbon-comprising current collector includes form factors, including but not limited to, sheet, film, foil, rod, tube, plate, woven fabric, textile, tape, microfoil, coating or laminate upon metal sheet, film, foil, rod, tube, plate, tape, or microfoil.

In some embodiments, the carbon-containing current collector has a thickness of between about 5 and about 200 μm. In some specific embodiments, the current collector containing the carbonaceous material in whole or in part has a thickness between about 5 and about 200 μm, between about 10 and about 150 μm, between about 15 and about 100 μm, between about 20 and about 80 μm, between about 30 and about 50 μm, between about 40 and about 50 μm, between about 100 and about 200 μm, between about 120 and about 180 μm, or between about 130 and about 150 μm. In some specific embodiments, the current collector contains the carbonaceous material in part and contains a second material. In other embodiments, the current collector contains a metal coated by a carbonaceous material. In some specific embodiments, the carbon coating has a thickness of between about 5 and about 180 μm, between about 10 and about 150 μm, between about 15 and about 100 μm, between about 20 and about 80 μm, between about 30 and about 50 μm, between about 40 and about 50 μm, between about 100 and about 200 μm, between about 120 and about 180 μm, or between about 130 and about 150 μm. In other specific embodiments, the metal is a metal layer with a thickness of between about 5 and about 180 µm, between about 10 and about 150 µm, between about 15 and about 100 µm, between about 20 and about 80 µm, between about 30 and about 50 µm, between about 40 and about 50 µm, between about 100 and about 200 µm, between about 120 and about 180 µm, or between about 130 and about 150 µm.

The positive electrode layer can include a positive electrode active material. Non-limiting examples of positive electrode active material for the Mg battery include Chevrel phase $Mo_6S_8$, $MnO_2$, CuS, $Cu_2S$, $Ag_2S$, $CrS_2$, $VOPO_4$, layered structure compounds such as $TiS_2$, $V_2O_5$, $MgVO_3$, $MoS_2$, $MgV_2O_5$, $MoO_3$, Spinel structured compounds such as $CuCr_2S_4$, $MgCr_2S_4$, $MgMn_2O_4$, $Mg_2MnO_4$, NASICON structured compounds such as $MgFe_2(PO_4)_3$ and $MgV_2(PO_4)_3$, Olivine structured compounds such as $MgMnSiO_4$ and $MgFe_2(PO_4)_2$, Tavorite structured compounds such as $Mg_{0.5}VPO_4F$, pyrophosphates such as $TiP_2O_7$ and $VP_2O_7$, and fluorides such as $FeF_3$. In some embodiments, the positive electrode layer further includes an electronically conductive additive. Non-limiting examples of electronically conductive additives include carbon black, Super P, Super C65, Ensaco black, Ketjen black, acetylene black, synthetic graphite such as Timrex SFG-6, Timrex SFG-15, Timrex SFG-44, Timrex KS-6, Timrex KS-15, Timrex KS-44, natural flake graphite, carbon nanotubes, fullerenes, hard carbon, and mesocarbon microbeads. In some embodiments, the positive electrode layer further comprises a polymer binder. Non-limiting examples of polymer binders include poly-vinylidene fluoride (PVdF), poly(vinylidene fluoride-co-hexafluoropropene) (PVdF-HFP), Polytetrafluoroethylene (PTFE), Kynar Flex 2801, Kynar Powerflex LBG, and Kynar HSV 900, and Teflon.

The negative electrode layer can include a negative electrode active material. Non-limiting examples of negative electrode active material for the Mg battery include Mg, common Mg alloys such as AZ31, AZ61, AZ63, AZ80, AZ81, AZ91, AM50, AM60, Elektron 675, ZK51, ZK60, ZK61, ZC63, M1A, ZC71, Elektron 21, Elektron 675, Elektron, Magnox, and insertion materials such as Anatase $TiO_2$, rutile $TiO_2$, $Mo_6S_8$, $FeS_2$, $TiS_2$, $MoS_2$. In some embodiments, the negative electrode layer further includes an electronically conductive additive. Non-limiting examples of electronically conductive additives include carbon black, Super P, Super C65, Ensaco black, Ketjen black, acetylene black, synthetic graphite such as Timrex SFG-6, Timrex SFG-15, Timrex SFG-44, Timrex KS-6, Timrex KS-15, Timrex KS-44, natural flake graphite, carbon nanotubes, fullerenes, hard carbon, and mesocarbon microbeads. In some embodiments, the negative electrode layer further includes a polymer binder. Non-limiting examples of polymer binders include poly-vinylidene fluoride (PVdF), poly(vinylidene fluoride-co-hexafluoropropene) (PVdF-HFP), Polytetrafluoroethylene (PTFE), Kynar Flex 2801, Kynar Powerflex LBG, and Kynar HSV 900, and Teflon.

In some embodiments, the Mg battery described herein includes a positive electrode current collector comprising carbonaceous material. In some embodiments, the Mg battery described herein includes a negative electrode current collector comprising carbonaceous material. In some embodiments, the Mg battery described herein includes positive and negative electrode current collectors comprising carbonaceous material.

In some embodiments, the Mg battery disclosed herein is a button or coin cell battery consisting of a stack of negative electrode, porous polypropylene or glass fiber separator, and positive electrode disks in a can base onto which a can lid is crimped. In other embodiments, the Mg battery disclosed herein is a stacked cell battery. In other embodiments, the Mg battery disclosed herein is a prismatic, or pouch, cell consisting of one or more stacks of negative electrode, porous polypropylene or glass fiber separator, and positive electrode sandwiched between current collectors wherein one or both current collectors comprise carbonaceous materials. The stack(s) are folded within a polymer coated aluminum foil pouch, vacuum and heat dried, filled with electrolyte, and vacuum and heat sealed. In other embodiments, the Mg battery disclosed herein is a prismatic, or pouch, bi-cell consisting of one or more stacks of a positive electrode which is coated with active material on both sides and wrapped in porous polypropylene or glass fiber separator, and a negative electrode folded around the positive electrode wherein one or both current collectors comprise carbonaceous materials. The stack(s) are folded within a polymer coated aluminum foil pouch, dried under heat and/or vacuum, filled with electrolyte, and vacuum and heat sealed. In some embodiments of the prismatic or pouch cells described herein, an additional tab composed of a metal foil or carbonaceous material of the same kind as current collectors described herein, is affixed to the current collector by laser or ultrasonic welding, adhesive, or mechanical contact, in order to connect the electrodes to the device outside the packaging. In other embodiments, the Mg battery disclosed herein is a wound or cylindrical cell consisting of wound layers of one or more stacks of a positive electrode which is coated with active material on one or both sides, sandwiched between layers of porous polypropylene or glass fiber separator, and a negative electrode wherein one or both current collectors comprise carbonaceous materials. The stack(s) are wound into cylindrical roll, inserted into the can, dried under heat and/or vacuum, filled with electrolyte, and vacuum and welded shut. In some embodiments of the cylindrical cells described herein, an additional tab composed of a metal foil or carbonaceous material of the same kind as current collectors described herein, is affixed to the current collector by laser or ultrasonic welding, adhesive, or mechanical contact, in order to connect the electrodes to the device outside the packaging.

Figure 5:
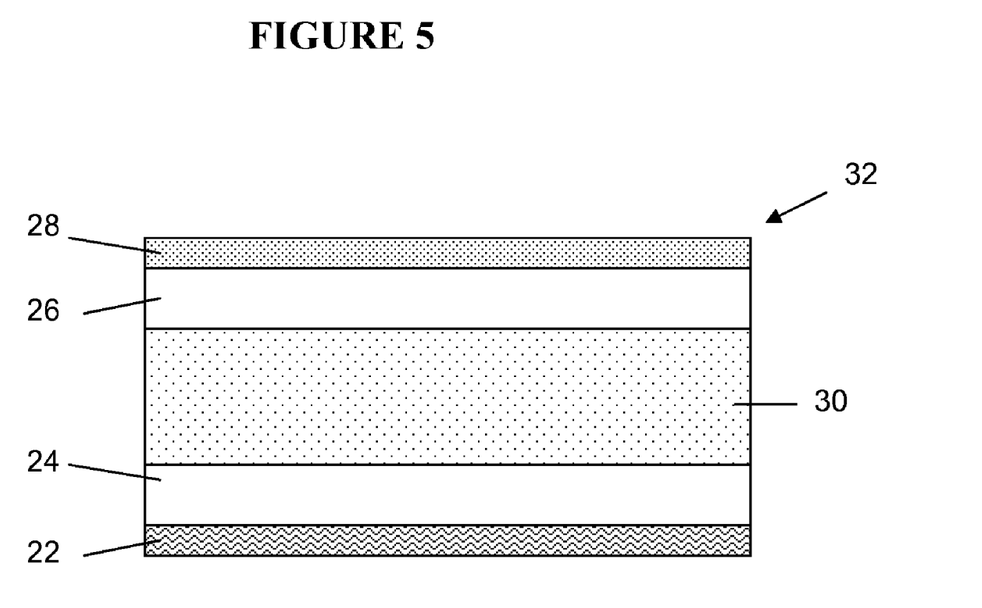
FIG. 5 illustrates a magnesium battery including a carbon-containing positive electrode current collector and a carbon-containing negative electrode current collector.

A non-limiting examples of a Mg battery 32 as described herein is shown in FIG. 5. Mg Battery 32 comprises a carbon-containing positive electrode current collector 28 and a positive electrode layer 26 deposited on current collector 28. In addition, the Mg battery 32 includes a carbon-containing negative electrode current collector 22 and a positive electrode layer 24 deposited on current collector 22. A layer of electrolyte is disposed between the positive and the negative electrodes. Suitable examples of electrolytes include, but are not limited to, Lewis-base organo-magnesium compounds of RMgX wherein R is selected from a group comprising akyl ligands such as methyl, ethyl, butyl, or aryl, benzyl, amido, napthal, phenyl, alkenyl, alkynyl, or derivatives thereof; X is a halide F, Cl, Br, I. In some embodiments, the electrolyte further comprises a Lewis-acidic compound to induce transmetallation. Non-limiting examples of Lewis-acid compounds include $AlCl_3$, $BCl_3$, $AlCl_2Et$, $FeCl_2$, $FeCl_3$, $TiCl_4$. In some embodiments, the electrolyte further comprises a salt. Non-limiting examples of salts include $MgCl_2$, $Mg(ClO_4)_2$, $Mg(BF_4)_2$, $Mg(AsF_6)_2$, $Mg(PF_6)_2$, $Mg(CF_3SO_3)_2$, $Mg[N(CF_3SO_2)_2]_2$, $Mg[C(SO_2CF_3)_3]_2$, LiCl, $LiClO_4$, $LiBF_4$, $LiAsF_6$, $LiPF_6$, $Li(CF_3SO_3)$, $LiN(CF_3SO_2)_2$, $LiC(SO_2CF_3)_3$, NaCl, $NaClO_4$, $NaBF_4$, $NaAsF_6$, $NaPF_6$, $Na(CF_3SO_3)$, $NaN(CF_3SO_2)_2$, $NaC(SO_2CF_3)_3$. In some embodiments, the electrolyte further comprises one or a combination of aprotic solvents. Non-limiting examples of solvents include ether, polyethers, tetrahydrofuran, 2-methyl tetrahydrofuran, dimethoxyethane, glyme, monoglyme, dimethyl glycol, ethylene glycol, dimethyl ether, diethyl ether, ethyl glyme, diglyme, proglyme, ethyl diglyme, triglyme, butyl diglyme, tetraglyme, polyglyme, and higlyme. A separator (not shown) can also be disposed between the positive and negative electrodes.

Figure 3:
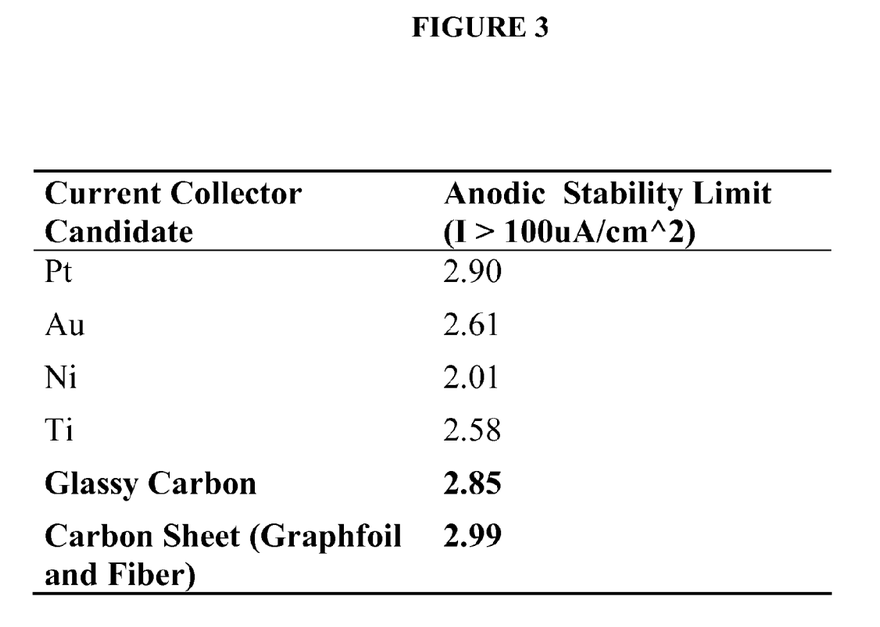
FIG. 3 illustrates tabulated anodic stability of carbon-based current collectors including examples of glassy carbon, and graphite or carbon fiber sheets which all demonstrate anodic stability in organo-Mg electrolytes (e.g., APC) higher than other readily available materials such as Ni, Ti, Al, and SS, and equal to noble metal current collectors such as Pt and Au.
Figure 6:
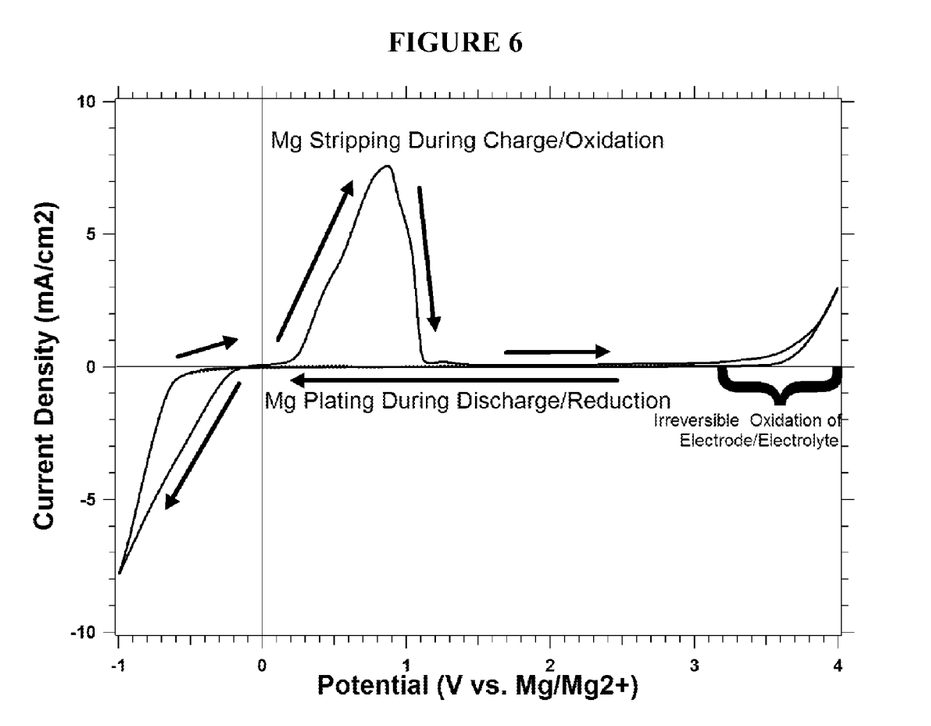
FIG. 6 is a voltammogram obtained with a cell employing carbon fiber as the working electrode's current collector, and magnesium metal as both counter and reference electrodes immersed in 0.25 M APC (2 $PhMgCl:1\ AlCl_3$).

Carbon-based materials often display varying degrees of chemical inertness related to the atomic disorder on the surface, or in the case of graphitic compounds the percentage of basal planes to edge sites present at the surface. A variety of carbon-based materials exhibit anodic stability equivalent to, or better than, noble metals such as Pt. For example, as shown in FIG. 3, glassy carbon exhibits anodic stability to 2.85 V vs. $Mg/Mg^{2+}$ in APC solution while sheets carbon fiber and graphite foil (graphfoil) do not detrimentally interact with the electrolyte until potentials >2.99 V vs. $Mg/Mg^{2+}$. The carbon-containing current collectors as described herein enable both reversible Mg deposition/stripping from APC solution as well as high anodic stability. FIG. 6 shows this characteristic behavior as a voltammogram from a cell employing carbon fiber foil as the working electrode, and magnesium metal as both counter and reference electrodes, all immersed in 0.25 M APC (2 PhMgCl:1 $AlCl_3$). The initial voltage scan proceeds from OCV to −1 V vs. $Mg/Mg^{2+}$ at 25 mV/sec, displaying a current response caused by Mg deposition from the electrolyte solution. Subsequently the voltage is swept in the positive direction, causing a positive current response due to Mg stripping from the surface of the carbon electrode (displayed as a peak with maximum current at +0.9 V vs. $Mg/Mg^{2+}$). Thereafter the sweep continues in the positive direction to +4 V vs. $Mg/Mg^{2+}$, and the current response decreases to background levels (i.e., <100 $\mu A/cm^2$) until the voltage becomes greater than 2.99 V vs. $Mg/Mg^{2+}$ thus indicating the corrosion of the working electrode by the electrolyte and/or decomposition of the electrolyte. Anodic stability of the electrolyte is determined to be 2.99 V vs. Mg (above this voltage the current response surpasses 100 $\mu A/cm^2$). Thus carbon-based materials such as carbon fiber, glassy carbon, and graphite foils, will enable the full 3 V window of the electrolyte to be utilized by a high energy density cathode material.

Figure 7:
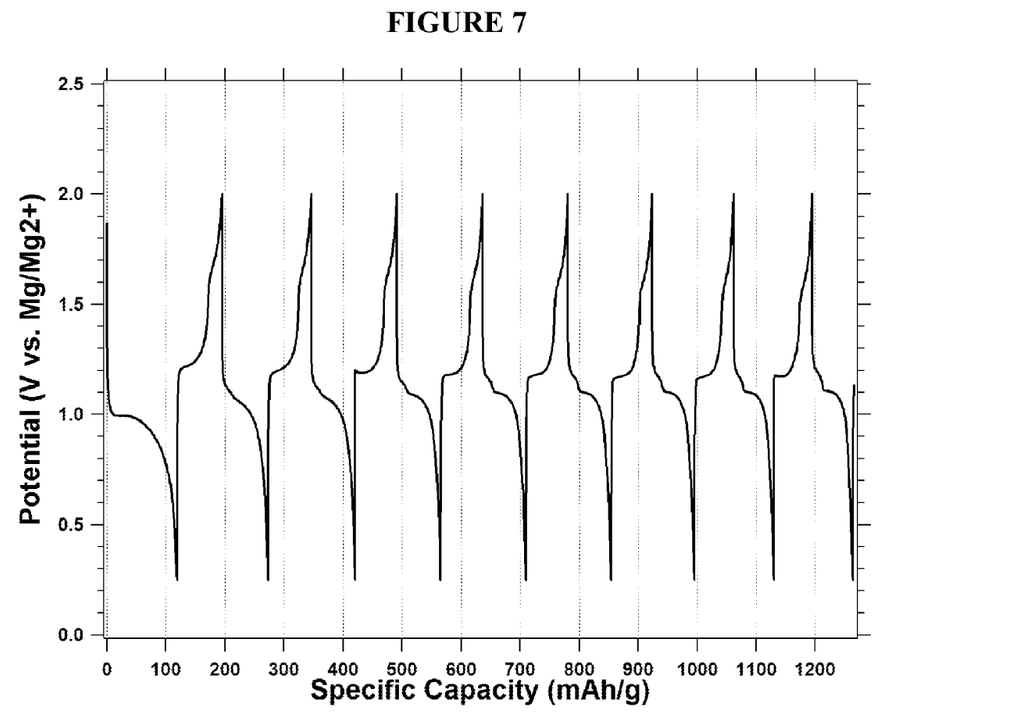
FIG. 7 is an example of a cell containing $Mo_6S_8$ active cathode on a carbon fiber current collector demonstrating the stability of current collector against corrosion when employed in a practical cell for 9.5 cycles of discharge and charge.

FIG. 7 shows the voltage profile of a cell containing a cathode of $Mo_6S_8$ coated on a carbon fiber current collector and discharging down to 0.25 V vs. $Mg/Mg^{2+}$ followed by charging to 2 V vs. $Mg/Mg^{2+}$. This voltage window results in the nominal reversible capacity of ~80 mAh/g for $Mo_6S_8$, which was not enabled by the Al metal current collectors (see FIG. 1) often used in an Li system. Furthermore, the stability of carbon-based current collector, e.g., carbon fiber, against corrosion is demonstrated in FIG. 7 as 10 cycles of discharge and charge are completed with little irreversible capacity observed. Thus, unlike Al this current collector enables full nominal capacity for $Mo_6S_8$. Consequently, the inert nature of carbon-based materials such as carbon fiber, glassy carbon, and graphite foils, as well as the variety of form factors, including but not limited to sheet, foil, microfoil, coating or laminate upon metal foil, plate, and rod will enable cost-effective fabrication of electrodes and cells for rechargeable Mg batteries.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that the invention may be practiced otherwise than as specifically described. Accordingly, those skilled in the art would recognize that the use of an electrochemical device in the examples should not be limited as such. The present invention is directed to each individual feature, system, or method described herein. In addition, any combination of two or more such features, systems or methods, if such features, systems or methods are not mutually inconsistent, is included within the scope of the present invention.

What is claimed is:

1. A rechargeable magnesium battery electrode assembly, comprising:
   a current collector comprising a metal coated with a carbonaceous material;
   an electrode layer comprising an electroactive material capable of reversible electrochemical insertion of magnesium disposed on the current collector; and
   a magnesium-ion electrolyte comprising a non-aqueous solvent and a halide-containing salt, wherein said carbonaceous material is selected to inhibit a corrosion reaction between said metal and said magnesium ion electrolyte.

2. The magnesium battery electrode assembly of claim 1, wherein the carbonaceous material is selected from group consisting of graphitic carbon, carbon fiber, glassy carbon, pyrolitic carbon, amorphous carbon, and a combination thereof.

3. The magnesium battery electrode assembly of claim 1, including a form factor, wherein the form factor is one or more form factors selected from the group consisting of sheet, film, foil, rod, tube, plate, woven and non-woven fabric, textile, tape, microfoil, coating, laminate, and combinations thereof.

4. The magnesium battery electrode assembly of claim 1, wherein the electrode is a positive electrode.

5. The magnesium battery electrode assembly of claim 1, wherein the electrode is a negative electrode.

6. The magnesium battery electrode assembly of claim 1, wherein the metal is one or more metals selected from the group consisting of Al, Cu, Ti, Ni, stainless steel, and alloys thereof.

7. The magnesium battery electrode assembly of claim 4, wherein the positive electrode active material is one or more materials selected from the group consisting of Chevrel phase $Mo_6S_8$, $MnO_2$, CuS, $Cu_2S$, $Ag_2S$, $CrS_2$, and $VOPO_4$; layered compounds $TiS_2$, $V_2O_5$, $MgVO_3$, $MoS_2$, $MgV_2O_5$, and $MoO_3$; Spinel structured compounds $CuCr_2S_4$, $MgCr_2S_4$, $MgMn_2O_4$, and $Mg_2MnO_4$; NASICON structured compounds $MgFe_2(PO_4)_3$ and $MgV_2(PO_4)_3$; Olivine structured compounds $MgMnSiO_4$ and $MgFe_2(PO_4)_2$; Tavorite structured compound $Mg_{0.5}VPO_4F$; pyrophosphates $TiP_2O_7$ and $VP_2O_7$; $FeF_3$, and combinations thereof.

8. The magnesium battery electrode assembly of claim 7, wherein the positive electrode layer further comprises an electronically conductive additive.

9. The magnesium battery electrode assembly of claim 7, wherein the positive electrode layer further comprises a polymeric binder.

10. The magnesium battery electrode assembly of claim 4, further comprising a negative electrode.

11. The magnesium battery of claim 1, wherein the halide-containing salt comprises:
    a Lewis-base organo-magnesium compound RMgX, wherein R is selected from a group consisting of alkyl ligands such as methyl, ethyl, butyl, or aryl, benzyl, amido, napthal, phenyl, alkenyl, alkynyl, or derivatives thereof and X is a halide F, Cl, Br, I; and a Lewis-acid compound selected from the group consisting of $AlCl_3$, $BCl_3$, $AlCl_2Et$, $FeCl_2$, $FeCl_3$, and $TiCl_4$ and mixtures thereof.

12. The magnesium battery of claim 1, wherein the solvent is one or more solvents selected from the group consisting of ether, polyethers, tetrahydrofuran, 2-methyl tetrahydrofuran, dimethoxyethane, glyme, monoglyme, dimethyl glycol, ethylene glycol, dimethyl ether, diethyl ether, ethyl glyme, diglyme, proglyme, ethyl diglyme, triglyme, butyl diglyme, tetraglyme, polyglyme, highlyme, and combinations thereof.

13. The magnesium battery of claim 11, wherein the electrolyte further comprises an additional salt.

14. The magnesium battery of claim 13, wherein the additional salt is one or more salts selected from the group consisting of $MgCl_2$, $Mg(ClO_4)_2$, $Mg(BF_4)_2$, $Mg(AsF_6)_2$, $Mg(PF_6)_2$, $Mg(CF_3SO_3)_2$, $Mg[N(CF_3SO_2)_2]_2$, $Mg[C(SO_2CF_3)_3]_2$, LiCl, $LiClO_4$, $LiBF_4$, $LiAsF_6$, $LiPF_6$, $Li(CF_3SO_3)$, $LiN(CF_3SO_2)_2$, $LiC(SO_2CF_3)_3$, NaCl, $NaClO_4$, $NaBF_4$, $NaAsF_6$, $NaPF_6$, $Na(CF_3SO_3)$, $NaN(CF_3SO_2)_2$, $NaC(SO_2CF_3)_3$, and combinations thereof.

* * * * *